Jan. 23, 1962 K. R. SKINNER ET AL 3,018,329

TELEVISION TUNING APPARATUS

Filed July 1, 1958

INVENTORS
Kenneth P. Skinner &
Leon J. Sienkiewicz
BY Benjamin DeWitt
ATTORNEY

3,018,329
TELEVISION TUNING APPARATUS

Kenneth R. Skinner and Leon J. Sienkiewicz, Metuchen, N.J., assignors to Westinghouse Electric Corporation, East Pittsburgh, Pa., a corporation of Pennsylvania Filed July 1, 1958, Ser. No. 745,987
8 Claims. (Cl. 178—5.8)

This invention relates generally to television receivers and, more particularly, to automatic frequency control circuits for them.

The principles of intercarrier sound systems are well known in the art, one description of them may be found in U.S. Patent No. 2,448,908. For this reason there will be no discussion of these principles in the following specifications. The terms "intercarrier frequency" and "intercarrier signal" as used in the specification and claims are intended to designate the beat frequency between picture and sound carriers. According to present standards of the Federal Communications Commission this frequency difference is 4.5 megacycles. Should these standards be changed by specifying a different carrier frequency spacing, the term "intercarrier frequency" will designate the new frequency difference between the picture and sound carriers.

It has been the practice in the design of a television receiver of the intercarrier sound type to employ some sort of attenuation circuit to control the sound carrier level relative to the picture carrier level. The attenuation circuits, although helping to shape the overall picture intermediate frequency response curve, are provided primarily to prevent beats in the second detector between the sound carrier and high frequency video components. In a single second detector type of color television receiver, an even greater attenuation is usually required at the accompanying sound carrier frequency to prevent beats between the high frequency color components and the sound carrier.

It is highly desirable that the frequency of the local oscillator in both monochrome and color television receivers be controlled in order to control the frequency of the intermediate sound signal so as to assure adequate rejection of the accompanying sound carrier by the attenuation circuit.

In the copending application Serial No. 722,735, filed March 20, 1958, entitled "Television Apparatus" by Charles W. Baugh, Jr., there is described an automatic fine tuning system for an intercarrier type television receiver by means of which the frequency of the local oscillator is controlled. In accordance with the principles set forth in said copending application, use is made of the intercarrier sound signal and the direct current signal component developed at the second detector to effect control of the frequency of the local oscillator. In particular, in said copending application, use of local oscillator frequency stabilization is achieved by a first control signal which is a function of the level or amplitude of the intercarrier sound signal and a second control signal which is a function of the direct current component or average direct current voltage developed at the second detector.

Automatic fine tuning systems of the type described in the aforementioned copending application are intended to eliminate the need of fine tuning adjustment by the viewer. With television receivers not having automatic fine tuning many television viewers tend to watch programs under the strain of improperly tuned pictures. Automatic fine tuning (AFT) of the aforementioned type electronically maintains the tuner oscillator on correct frequency thereby avoiding the loss of picture detail and eliminating the sound-in-picture interference which commonly accompanies oscillator frequency drift. In addition, AFT greatly simplifies the provision of remote control systems for television receivers thereby reducing the cost of such receivers. Automatic fine tuning systems of the general type disclosed in the above-mentioned copending application will be referred to, for the sake of brevity as AFT systems.

One factor which has heretofore limited the commercial use of AFT systems was the necessity of providing for abnormal tuning when operating under unfavorable conditions such as reception of weak, ultra-fringe-area signals, or signals in the presence of high level interference.

In reception of such abnormal signals, the average viewer desires to compensate by tuning the local oscillator to move the picture IF carrier further into the passband, thereby improving the video signal to noise ratio.

Thus it is desirable to provide a manually operable fine tuning control means for abnormal signal reception even though the AFT circuit is adequate for normal signals.

The present invention provides an AFT system for television receivers which normally controls the frequency of the local oscillator to maintain optimum tuning for reception of strong and normal signals. Further, the invention provides manual control means for adjusting the frequency of the intermediate frequency signals independently of the AFT feedback control network and provides switching means commonly operable with the manual control means for rendering the feedback network inoperative during control of the frequencies by the manual control means.

Accordingly, among the objects of the present invention are the following:

To provide an improved automatic frequency control system for television receivers.

To provide a television receiver of the intercarrier type in which the frequency of the IF video carrier signal is automatically stabilized and in which the same frequency may be manually adjusted and controlled independently of the automatic stabilization system.

To provide an improved television receiver including automatic control means for stabilizing the frequency of the heterodyne oscillator at a predetermined frequency interval from the received radio frequency signal and further including means for manually controlling said frequency interval independently of the automatic control.

To provide a generally improved television receiver having simplified manual control means.

These and other objects of this invention will be apparent from the following description taken in accordance with the accompanying drawing, throughout which like reference characters indicate like parts, and in which.

Figure 1:
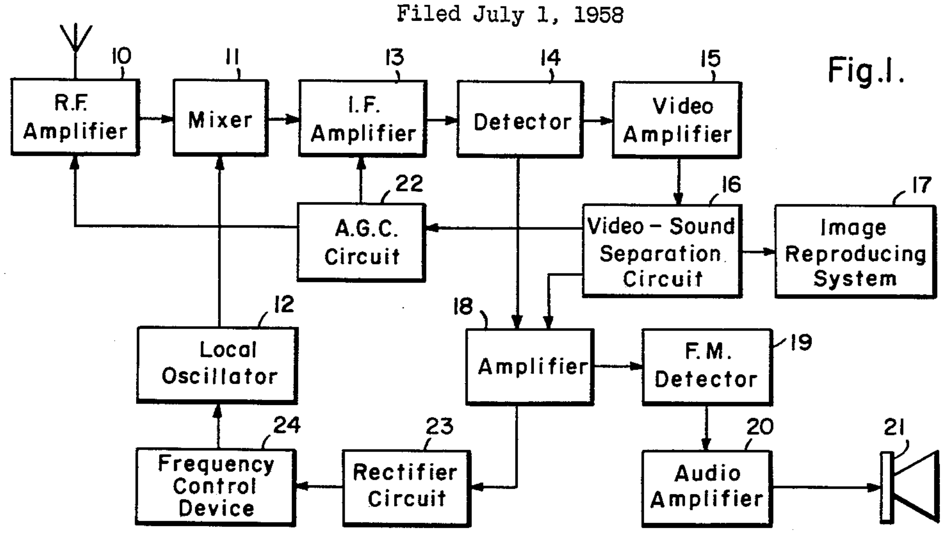
FIGURE 1 is a block diagram of the television receiver in accordance with the invention.

Referring to FIG. 1, there is shown an RF amplifier 10, an oscillator 12, a mixer 11, an intermediate frequency amplifier 13, a second detector 14, a video amplifier 15, and a video sound separation circuit 16, which components will be recognizable to those skilled in the television art as being exemplary components of one form of intercarrier television receiver system. The television signal is intercepted by an antenna and is translated through circuits 10 to 16 to produce a video signal at the output of separation circuit 16 which signal is suitable for application to a conventional image reproducing device 17. In addition, the second detector 14 operates to heterodyne the intermediate frequency sound and picture carriers to produce an intercarrier beat frequency signal of a nominal frequency corresponding to the frequency difference between the intermediate frequency picture and sound carriers. According to present standards, this frequency difference is 4½ megacycles and accordingly the intercarrier signal has a nominal frequency of 4½ megacycles.

Figure 3:
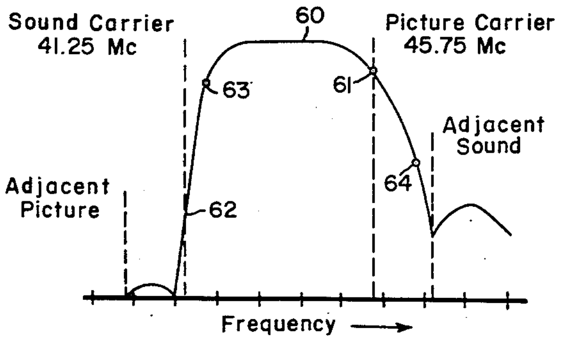
FIG. 3 illustrates an IF frequency response characteristic curve for a television receiver in accordance with the invention.

The IF amplifier 13 preferably has a frequency response characteristic substantially as shown in FIG. 3. The amplitude of the intercarrier sound signal which is produced in the second detector 14 of the receiver is a function of the position of the sound modulated intermediate frequency carrier signal with respect to the desired frequency response characteristic. The amplitude of the sound intercarrier signal will change whenever the intermediate frequency video and sound signals depart from predetermined normal positions with respect to the response characteristic of the intermediate frequency amplifier.

Thus, the intercarrier type system including circuits 10 to 15 inclusive comprises a signal source for developing and providing, to separation circuit 16, a composite video signal and a frequency modulated intercarrier signal the amplitude of which is dependent upon the deviation of the intermediate frequency sound carrier from a predetermined frequency. The correctness of tuning of local oscillator 12 determines the frequency of the IF sound carrier. Accordingly, the intercarrier signal amplitude is dependent upon the degree of mistuning of oscillator 12.

At second detector 14 the picture signals are derived from the picture carrier IF signal and the picture and sound IF carrier signals are heterodyned to produce the intercarrier signal. The video wave and the intercarrier signal are transmitted by conventional amplifier 15 to a video-sound separation circuit 16 which separates the video signal from the intercarrier sound signal and applies the video signal to a suitable image reproducing system 17.

The intercarrier sound signal, from separation circuit 16, is applied to a sound signal channel comprising an amplifier 18, a frequency modulation detector 19, an audio amplifier 20, and a conventional sound-reproducing device 21.

The video output from the video-sound separation circuit 16 is also applied to an automatic gain control circuit 22 of the "peak detection type" which acts in a well-known manner to control the amplification of the radio frequency amplifier 10 and the intermediate amplifier 13.

A rectifier circuit 23 is connected between the amplifier 18 and a frequency control device 24. The output of the rectifier circuit 23 is applied to the frequency control device 24 which, in turn, controls the frequency of the local oscillator 12. The frequency control device 24 may comprise a semiconductor diode which, in series with a capacitor, is connected across the tank circuit of the local oscillator 12, thereby shunting a variable reactance across the tank circuit and hence comprising means for changing the frequency of the local oscillator. Variation of reactance is accomplished by varying the effective load applied to the diode to control its conduction. Variable loading is controlled or supplied by a direct current voltage control signal generated by the rectifier circuit 23.

Figure 2:
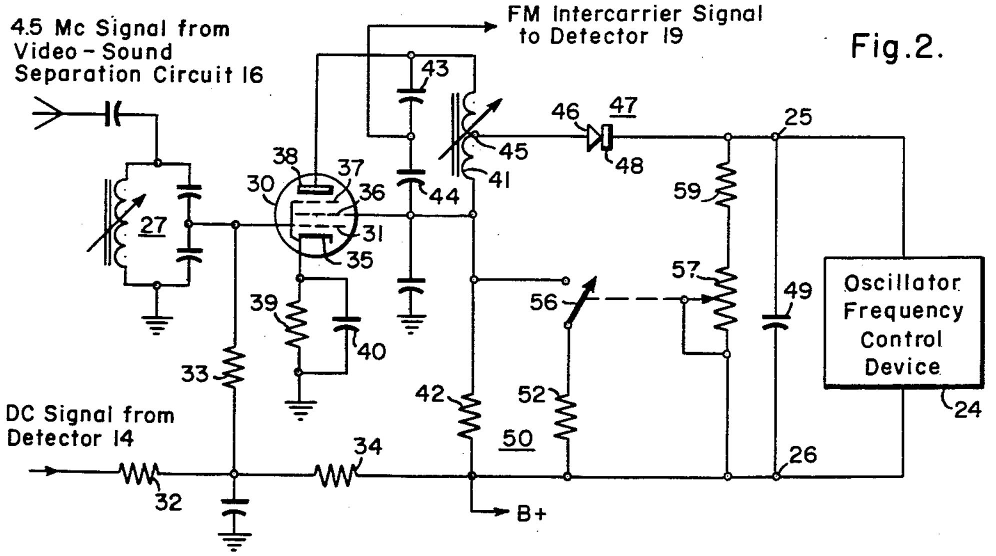
FIG. 2 is a circuit diagram in schematic form of an automatic frequency control circuit in accordance with the invention.

The system as thus far described is substantially identical to that set forth in detail in the aforementioned Baugh application, Serial No. 722,735 and hence need not be further particularized here. FIG. 2 shows schematically the AFT feedback network comprising the intercarrier–AFT signal amplifier 18 and the rectifier circuit 23 of FIG. 1.

Referring to FIG. 2 in detail, the intercarrier signal from the video sound separation circuit 16 is coupled to the control grid 31 of an electron discharge device 30 via a conventional bandpass filter 27. A direct current voltage developed at second detector 14 is also coupled through resistors 32 and 33 to the control grid 31 of the device 30. From the junction of resistors 32 and 33 a connection is made through a resistor 34 to a source of direct current potential B+. The negative terminal of potential source B+ is connected to a point of reference potential or ground in accordance with conventional practice.

Electron discharge device 30 is provided with a cathode 35, a screen grid 36, a suppressor electrode 37 and an anode 38. The cathode 35 is connected to ground potential through a resistor 39 shunted by a bypass capacitor 40. The anode 38 is connected through an inductor 41 and a voltage dropping resistor 42 to the source of operating potential B+. A pair of capacitors 43 and 44 are connected across the inductor 41, and from the junction point between them a connection is made to the frequency modulation detector 19. A tap 45 on the inductor 41 is connected to the anode 46 of a diode rectifier device 47.

A first terminal 25 of the frequency control device 24 is connected to the source of operating potential B+. A second terminal 26 of the frequency control device 24 is connected to the cathode or emitter electrode 48 of the rectifier device 47, and a filter capacitor 49 is shunted across the terminals 25—26 to smooth the direct current control signal applied to control device 24 from rectifier device 47.

The electron discharge device 30 together with the immediately associated circuits including inductor 41 and capacitors 43 and 44 constitutes an intercarrier signal amplifier means 18 coupled between the second detector 14 and the FM detector 19. The intercarrier amplifier 18 is normally operative to linearly amplify and transmit the intercarrier signal. Rectifier device 47, the lower portion of inductor 41 and capacitor 49 with their respective interconnections comprise a rectifier circuit for deriving a direct current control signal corresponding to the amplitude of the intercarrier signal at the output of amplifier 18. The frequency control device 24 is connected to oscillator 12 and operates to control the frequencies of the IF picture and sound carrier signals in response to the magnitude of the control signal current from rectifier 47.

A second voltage dropping or anode load resistance member 52 is connected at one end to the lower end of resistor 42 and at its other end through a switch device 56 to the upper end of resistor 42. The resistance members 42 and 52 comprise a resistance network 50 connected, in series with the potential source B+, between the cathode 35 and anode 38 of the discharge device 30 for applying operating potential thereto. The first resistance member 42 preferably has a resistance value at least an order of magnitude greater than that of the second resistance member 52. With switch 56 closed, the anode current from discharge device 30 develops a relatively small voltage across the resistance network 50 which voltage is applied by way of inductor 41 and control device 24 to the rectifier device 47. The bias voltage thus applied to rectifier device 47 maintains it non-conductive in the absence of intercarrier signals at inductor 41 and when the intercarrier signal is below a predetermined optimum amplitude.

Connected serially between terminals 25 and 26 are a fixed resistor 59 and a variable resistance member 57 which is ganged with switch 56 so that switch 56 is closed only when resistance 57 is adjusted to its maximum resistance. The resistance members 57 and 59 constitute a manually operable means for controlling the reactance of control device 24 independently of the direct current control signal from the rectifier device 47.

As shown in FIG. 3, the intermediate frequency amplifier 13 has a frequency response characteristic indicated by curve 60. On curve 60, point 61 represents the preferred location of the video IF carrier approximately six decibels below the maximum IF response, and point 62 defines the preferred location of the sound IF carrier. When so located, the sound IF carrier is attenuated about 30 to 50 decibels below the maximum IF response level.

At least about thirty decibles difference in amplification of the sound IF carrier relative to amplification of the picture IF carrier is desirable to (1) prevent sound signal components from appearing in the demodulated video output of detector 14 and (2) to enable production of a 4.5 megacycle sound intercarrier signal having a constant amplitude independent of amplitude modulation of the picture carrier. The foregoing is in accord with the principle that the amplitude of a beat frequency from a linear detector is determined by the amplitude of the smaller heterodyning signal and is independent of the amplitude of the larger signal (provided that the two signals are substantially different in amplitude).

The operation of the automatic fine tuning system will now be considered. As described in detail in the aforementioned copending application Serial No. 722,735 the frequency control device 24 comprises a diode and a capacitor serially connected to the tank circuit of oscillator 12. That diode rectifies a portion of the oscillator output and charges capacitor 49. Device 24 constitutes a capacitive load on the oscillator and, accordingly, the oscillator will operate at a frequency less than its natural frequency, with the frequency differential being proportional to the average load current flowing from control device 24 to terminals 25 and 26. Thus the oscillator frequency may be varied by varying the effective resistance connected across terminals 25—26. Resistors 57 and 59 constitute a manually operable means for adjusting that resistance. Amplifier 30 together with the biasing resistance network 50 and the rectifier circuit including device 47 comprise an automatic control means for varying the effective resistance across terminals 25 and 26.

When an active television channel is selected, the received television signals are respectively converted in the mixer 11 to intermediate frequency signals. The frequency of the local oscillator 12 is initially tuned high, the intermediate frequency sound carrier will be located at a position, such as at 63, which is high up on the response characteristic of the IF amplifier 13 and the IF picture carrier will be at a position such as at 64. The intermediate frequency picture carrier, at this position is so greatly attenuated that no beat between the IF picture and sound carriers occurs and no video signals or intercarrier sound signal will be developed. Under this condition the consequent large amplitude of the intermediate frequency sound carrier will cause a comparatively large direct current voltage to be developed at the second detector 14. This direct current voltage which is of negative polarity is applied through resistor 32 to bias the grid 31 of tube 30 negatively causing tube 30 to approach cutoff. At this time, the tube 30 is acting as a direct current amplifier. With the tube 30 near cutoff, only a small voltage drop is developed across the resistance network 50, and the diode rectifier 47 will conduct through the loop comprising control device 24, terminal 25, resistance network 50, the lower part of inductor 41, rectifier 47 and terminal 26. This current flow through the control device 24 lowers the effective load resistance at terminals 25 and 26 thereby shifting the frequency of the local oscillator 12 downwardly. The IF sound carrier is shifted lower in frequency so that it moves down the response characteristic toward point 62 and the IF picture carrier moves up the response characteristic toward point 61 of FIG. 3.

As the amplitude of the IF picture carrier increases, a 4.5 megacycle intercarrier sound signal is developed at detector 14 by heterodyning of the two IF carrier signals. As the sound IF carrier decreases, the bias voltage applied to discharge device 30 by way of resistors 32 and 33 will decrease so that discharge device 30 becomes operative to amplify the intercarrier signal applied thereto by way of filter 27. Discharge device 30 conducts a greater average anode current to gradually increase the voltage drop across the resistance network 50. Thus, the voltage drop across the resistance network 50 will combine with the direct current voltage developed by rectifier 47 in response to the 4.5 megacycle intercarrier signal to apply a direct current control signal across terminals 25 and 26. Referring to FIG. 3, it is seen that as the oscillator and the IF sound carrier frequencies decrease, the amplitude of the IF sound carrier will decrease in a substantially linear manner. As the sound IF carrier signal becomes considerably smaller in amplitude than the picture IF carrier, the intercarrier signal will vary in amplitude in proportion to the amplitude of the IF sound carrier. When the local oscillator 12 approaches correct frequency, the IF sound carrier approaches point 62 of FIG. 3 and the intercarrier sound signal has relatively low amplitude. Under this condition, the magnitude of the direct current control signal developed by rectifier 47 is primarily a function of the intercarrier signal amplitude. This control current is representative of the difference between the controlled frequency and the desired frequency of the local oscillator. The frequency control device 24 develops sufficient capacitive reactance to maintain the frequency of the local oscillator at the correct value thereby maintaining the IF picture and sound carrier signals at or near predetermined desired frequencies as indicated respectively at points 61 and 62 in FIG. 3.

If the local oscillator 12 should drift high in frequency the intercarrier sound signal will increase in amplitude and rectifier device 47 will conduct an increased control current through frequency control device 24. The increase in control current lowers the frequency of the local oscillator. Conversely, if the local oscillator should drift low in frequency, the intercarrier signal will decrease in ampitude and a lesser voltage will be generated by rectifier 47 thereby providing a decrease in the control current through device 24. Thus, it is seen that the automatic fine tuning system operates to stabilize the frequency of the local oscillator so that the IF sound carrier is maintained at or near point 62 of FIG. 3 and the intercarrier signal is held between predetermined minimum and maximum amplitude limits. The fine tuning system, when operating automatically, constitutes means for limiting the amplitude level of the intercarrier signal as applied to the frequency modulation detector 19. The foregoing describes the operation of the automatic fine tuning system with switch 56 being closed and with variable resistance 57 being set to its maximum resistance position.

Now consider the operation of the system of FIG. 2 with the variable resistance 57 adjusted to an intermediate position and with the switch 56 being open. The entire anode current of discharge device 30 will flow through resistance member 42 thereby generating a substantially greater voltage drop across resistor 42 than occurred heretofore across resistance network 50. The voltage drop across resistor 42 is applied through control device 24 and inductor 41 to reverse bias the rectifier device 47. The bias thus provided is sufficient to maintain rectifier device 47 non-conductive even in the presence of an intercarrier signal of appreciable amplitude at inductor 41. Accordingly, the intercarrier signal and the rectifier device 47 cannot provide a control signal or control current through the control device 24. The effective impedance across the terminals 25 and 26 is now determined solely by the series resistors 57 and 59. The load current through control device 24 can be varied by adjustment of the variable resistor 57 to adjust the frequency of local oscillator 12. Thus, the variable resistance member 57 constitutes a manually operable means for controlling the oscillator frequency.

When the oscillator frequency is controlled manually, the intermediate frequency sound carrier may move up the response characteristic and increase in amplitude thereby substantially increasing the amplitude of the intercarrier signal applied to discharge device 30. It is undesirable to apply intercarrier signals of excessively high amplitude to the FM detector 19. Accordingly, the circuit of the present invention provides means for limiting the amplitude of the intercarrier signal during control of the oscillator frequency by the manually operable frequency control means. To this end, the resistance of resistance member 42 is sufficiently high to severely limit the operating potential applied to anode 38 and screen grid 36 of the discharge device 30. With low anode and screen potentials, the pentode discharge device 30 will clip the peaks of the intercarrier signal so as to limit the amplitude thereof, and will further provide signal amplitude limiting action by grid leak rectification of the high amplitude intercarrier signal applied to control electrode 31. Thus with switch 56 being open, the discharge device 30 functions as an intercarrier signal amplitude limiter.

While the present invention has been shown in one embodiment only, it will be obvious to those skilled in the art that it is not so limited but is susceptible of various changes and modifications without departing from the spirit and scope thereof.

We claim as our invention:

1. A receiver comprising in combination a source adapted to supply at least two carrier frequencies, a first detector to which said carrier frequencies are supplied, a local oscillator, the output of said local oscillator being coupled to said first detector so as to produce at least two intermediate carrier frequency carriers, an intermediate frequency amplifier connected to the output of said first detector, said intermediate frequency amplifier being adapted to pass at least some energy of two of the intermediate frequency carriers supplied by said first detector, a second detector coupled to the output of said intermediate frequency amplifier for producing an intercarrier beat frequency signal, an intercarrier signal amplifier stage coupled to said second detector, means coupled to said amplifier stage for deriving a direct current control potential having a magnitude related to the amplitude of said intercarrier signal, variable reactance means coupled to said local oscillator for controlling the frequency thereof in response to said control potential, a variable resistance device connected to said variable reactance means so as to control the reactance thereof independently of said control potential, switch means commonly operable with said variable resistance device for rendering said control potential deriving means inoperative and causing said amplifier stage to function as an intercarrier signal amplitude limiter during control of said reactance by said resistance device.

2. A receiver comprising in combination a source adapted to supply at least two carrier frequencies, a first detector to which said carrier frequencies are supplied, a local oscillator, the output of said local oscillator being coupled to said first detector so as to produce at least two intermediate carrier frequency carriers, an intermediate frequency amplifier connected to the output of said first detector, said intermediate frequency amplifier being adapted to pass at least some energy of two of the intermediate frequency carriers supplied by said first detector, a second detector coupled to the output of said intermediate frequency amplifier for producing an intercarrier beat frequency signal, circuit means including an intercarrier signal amplifier stage and a rectifier device coupled to the output circuit of said second detector to derive a direct current potential corresponding to the amplitude of said intercarrier signal, variable reactance means coupled to said local oscillator so as to control the frequency thereof in accordance with the electrical loading of said reactance means, said rectifier device being connected to said reactance means so as to load the same in proportion to said direct current potential, and a variable resistance device including switch means commonly operable therewith, said variable resistance device being connected across said reactance means to load the same independently of said direct current potential and said switch means being connected to said circuit means for applying cutoff bias to said rectifier device and causing said amplifier stage to function as an intercarrier signal amplitude limiter during control of said reactance by said variable resistance device.

3. In an intercarrier television receiver of the type which includes an oscillator and circuit means for developing a frequency modulated intercarrier signal the amplitude of which depends upon the deviation of the oscillator frequency from a predetermined frequency, the combination of: a frequency modulation detector for utilizing intercarrier signals of amplitudes lower than a predetermined maximum to produce intelligence signals, amplifier means coupled between said circuit means and said detector so as to transmit intercarrier signals to said detector, a rectifier circuit connected to the output of said amplifier circuit so as to produce a direct current control signal corresponding to the amplitude of said intercarrier signal, variable reactance means coupled between said rectifier circuit and said oscillator to control the frequency thereof in response to said control signal, and manually operable means for controlling said reactance means independently of said control signal, said manually operable means including switch means connected with said rectifier circuit for applying cutoff bias thereto and connected with said amplifier means for causing the same to function as a signal amplitude limiter during control of said reactance means by said manually operable means.

4. In an intercarrier type television receiver including a local oscillator, and a signal source for providing an intercarrier signal frequency modulated with sound information and having an amplitude dependent upon the degree of mistuning of said local oscillator, the combination of: a frequency modulation detector, an electron discharge device including at least an anode, a control electrode and a cathode, means for applying signals from said source to said control electrode, means for applying signals from said anode to said detector, a rectifier circuit connected with said last-mentioned means so as to derive a direct current control signal corresponding to the amplitude of said intercarrier signal, direct current responsive variable reactance means coupled between said rectifier circuit and said oscillator to control the frequency thereof in response to said control signal, circuit means including a source of direct current potential and a first resistance member connected serially between said cathode and said anode for applying operating potential to said discharge device, a second resistance member, switch means connected serially with said second resistance member to connect said first and second resistance members in parallel when the switch is closed, manually operable means for controlling the frequency of said oscillator independently of said control signal, said manually operable means and said switch means being commonly operable so that said switch is open during control of said oscillator by said manually operable means, and circuit means applying the voltage across said first resistance member to said rectifier circuit to apply cutoff bias thereto when said switch is open, with the resistances of said first and second resistance members being such that the voltage drop across said first resistance when said switch is open is of a magnitude to cause said discharge device to limit the amplitude of intercarrier signals applied to said frequency modulation detector.

5. In a television receiver for receiving at least two radio frequency carriers having a substantially constant predetermined frequency difference, the combination of superheterodyne converter means to which said carriers are applied for producing a separate intermediate frequency carrier in response to each of said radio frequency carriers, means for deriving an intercarrier signal of a frequency corresponding to said predetermined frequency difference, frequency selective amplifier means coupled between said converter means and said intercarrier signal deriving means and having a frequency response characteristic such that the amplitude of said intercarrier signal varies as a function of the frequency of one of said intermediate frequency carriers, frequency modulation detector means for producing intelligence signals in response to frequency modulated intercarrier signals of limited amplitudes, intercarrier signal amplifier means including an electron discharge device having at least an anode, a control electrode and a cathode coupled between said intercarrier signal deriving means and said detector means so as to transmit intercarrier signals thereto, a rectifier device, circuit means connected between said discharge device and said rectifier device for coupling a portion of said intercarrier signal to said rectifier device with said rectifier device being connected to produce a direct current control signal dependent upon the amplitude of said intercarrier signal, control circuit means connected between said rectifier device and said converter means for controlling the frequencies of said intermediate frequency carriers in response to the magnitude of said direct current control signal, circuit means including a source of direct current potential and a resistance network connected serially between said cathode and said anode for applying operating potential to said discharge device, said last-mentioned circuit means being connected to said rectifier device so that the voltage appearing across said resistance network is applied as reverse bias voltage across said rectifier device, and switch means connected to said resistance network, said switch means being selectively operable to change the effective resistance of said network from a first resistance value to a second resistance value, said second resistance value being such that (1) said reverse bias voltage maintains said rectifier device non-conductive thereby disabling said control circuit means, and (2) the anode voltage applied to said discharge device is reduced to a value such that said discharge device limits the amplitude of the intercarrier signals transmitted to said detector means.

6. In an intercarrier type television receiver including a heterodyne converter means for producing intermediate frequency carrier signals and circuit means to provide an intercarrier signal frequency modulated with sound intelligence and having an amplitude dependent upon the deviation of one of said intermediate frequency signals from a predetermined frequency, the combination of: frequency modulation detector means for producing intelligence signals in response to frequency modulated intercarrier signals of limited amplitudes, intercarrier signal amplifier means including an electron discharge device having at least an anode, a control electrode and a cathode coupled between said intercarrier signal deriving means and said detector means to transmit intercarrier signals thereto, a rectifier device, circuit means connected between said discharge device and said rectifier device for coupling a portion of said intercarrier signal to said rectifier device with said rectifier device being connected to produce a direct current control signal dependent upon the amplitude of said intercarrier signal, control circuit means connected between said rectifier device and said converter means for controlling the frequencies of said intermediate frequency carriers in response to the magnitude of said direct current control signal, circuit means including a source of direct current potential and a resistance network connected serially between said cathode and said anode for applying operating potential to said discharge device, said last-mentioned circuit means being connected to said rectifier device so that the voltage appearing across said resistance network is applied as reverse bias voltage across said rectifier device, and switch means connected to said resistance network, said switch means being selectively operable to change the effective resistance of said network from a first resistance value to a second resistance value, said first resistance value being such that the anode potential applied to said discharge device is sufficient to cause the same to operate as a substantially linear intercarrier signal amplifier, said second resistance value being such that said reverse bias voltage maintains said rectifier device non-conductive and the anode voltage applied to said discharge device is reduced to a value such that said discharge device operates non-linearly and limits the amplitude of the intercarrier signals transmitted to said detector means.

7. In a receiver including local oscillator means, and operative in response to a first carrier wave of a first frequency and a second carrier wave of a second frequency having a predetermined relation to said first frequency; and in which there is produced a separate IF carrier corresponding respectively to each of said waves with the frequency of each IF carrier being dependent upon the frequency of said local oscillator means; and in which said IF carriers are heterodyned to provide an intercarrier signal having an amplitude varying as a function of the amplitudes of said IF carriers; an intercarrier signal translating stage, means coupled to said stage for producing a control signal proportional to the amplitude of the intercarrier signal translated thereby, means for utilizing said control signal to control the frequency of said oscillator means, manually operable means for controlling the frequency of said oscillator means independently of said control signal, and means commonly operable with said manually operable means for selectively altering the parameters of said intercarrier signal translating stage in a manner such that said stage operates as a substantially linear amplifier when said oscillator means is controlled by said control signal and such that said stage operates as a signal amplitude limiter when said oscillator means is manually controlled.

8. In a television receiver for receiving a video modulated carrier wave and a sound modulated wave, and in which a heterodyne converter produces a separate IF carrier for each of said waves, and in which said IF carriers are heterodyned to provide an intercarrier signal having an amplitude varying as a function of the amplitude of said IF carriers, an intercarrier signal amplifier stage, means coupled to the output of said amplifier stage for producing a control signal varying in accordance with the amplitude of said intercarrier wave, means for applying said control signal to said heterodyne converter to control the frequencies of said IF carriers, manually operable means coupled with said last mentioned means for manually controlling the frequencies of said IF carriers independently of said control signal, and means commonly operable with said manually operable means for disabling said control signal producing means and for causing said amplifier stage to operate as an intercarrier signal amplitude limiter when the frequencies of said IF carriers are being manually controlled.

References Cited in the file of this patent

UNITED STATES PATENTS

| | | |
|---|---|---|
| 2,425,013 | Stotz | Aug. 5, 1947 |
| 2,664,464 | Cotsworth | Dec. 29, 1953 |
| 2,891,105 | Keizer | June 16, 1959 |

FOREIGN PATENTS

| | | |
|---|---|---|
| 905,377 | Germany | Mar. 1, 1954 |

OTHER REFERENCES

Rider Television Manual, vol. 6, Admiral TV, page 6–3, John F. Rider, Apr. 10, 1951.